(12) United States Patent
Troester et al.

(10) Patent No.: US 11,847,463 B2
(45) Date of Patent: Dec. 19, 2023

(54) MASKED MULTI-LANE INSTRUCTION MEMORY FAULT HANDLING USING FAST AND SLOW EXECUTION PATHS

(71) Applicant: ADVANCED MICRO DEVICES, INC., Santa Clara, CA (US)

(72) Inventors: Kai Troester, Boxborough, MA (US); Scott Thomas Bingham, Santa Clara, CA (US); John M. King, Austin, TX (US); Michael Estlick, Fort Collins, CO (US); Erik Swanson, Fort Collins, CO (US); Robert Weidner, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/585,973

(22) Filed: Sep. 27, 2019

(65) Prior Publication Data
US 2021/0096857 A1   Apr. 1, 2021

(51) Int. Cl.
*G06F 9/38* (2018.01)
*G06F 9/30* (2018.01)

(52) U.S. Cl.
CPC ........ *G06F 9/3861* (2013.01); *G06F 9/30036* (2013.01); *G06F 9/30038* (2023.08); *G06F 9/30043* (2013.01); *G06F 9/3887* (2013.01); *G06F 9/30018* (2013.01)

(58) Field of Classification Search
CPC .............. G06F 9/30145; G06F 9/30036; G06F 9/30043; G06F 9/3887; G06F 9/3001; G06F 9/30018; G06F 9/3861; G06F 9/30038
See application file for complete search history.

(56) References Cited

U.S. PATENT DOCUMENTS

| 6,330,657 B1* | 12/2001 | Col ................. G06F 9/3017 712/23 |
| 9,501,286 B2* | 11/2016 | Col ................. G06F 9/3017 |
| 2009/0172365 A1* | 7/2009 | Orenstien ........ G06F 9/3842 712/225 |

(Continued)

OTHER PUBLICATIONS

"Software Optimization Guide for AMD EPYC™ 7001 Processors", June, Advanced Micro Devices, pp. 20-21 (Year: 2017).*

(Continued)

*Primary Examiner* — Courtney P Carmichael-Moody

(57) ABSTRACT

A processor includes a load/store unit and an execution pipeline to execute an instruction that represents a single-instruction-multiple-data (SIMD) operation, and which references a memory block storing operand data for one or more lanes of a plurality of lanes and a mask vector indicating which lanes of a plurality of lanes are enabled and which are disabled for the operation. The execution pipeline executes an instruction in a first execution mode unless a memory fault is generated during execution of the instruction in the first execution mode. In response to the memory fault, the execution pipeline re-executes the instruction in a second execution mode. In the first execution mode, a single load operation is attempted to access the memory block via the load/store unit. In the second execution mode, a separate load operation is performed by the load/store unit for each enabled lane of the plurality of lanes prior to executing the SIMD operation.

20 Claims, 6 Drawing Sheets

(56) References Cited

U.S. PATENT DOCUMENTS

| | | | |
|---|---|---|---|
| 2012/0117420 A1* | 5/2012 | Goveas | G06F 9/30036 |
| | | | 714/15 |
| 2017/0177352 A1* | 6/2017 | Ould-Ahmed-Vall | ....................... |
| | | | G06F 9/3016 |
| 2018/0095756 A1* | 4/2018 | Hasenplaugh | G06F 9/30043 |
| 2020/0073662 A1* | 3/2020 | Rasale | G06F 9/30018 |

OTHER PUBLICATIONS

"AVX-512" accessed from https://en.wikipedia.org/wiki/AVX-512 on Sep. 25, 2019, 12 pages.

* cited by examiner

MASKED MULTI-LANE INSTRUCTION MEMORY FAULT HANDLING USING FAST AND SLOW EXECUTION PATHS

BACKGROUND

Single-instruction-multiple-data (SIMD) instructions permit the same operation to be performed on multiple lanes of data in parallel. The Advanced Vector Extensions (AVX) class of instructions provides SIMD functionality in the x86 instruction set architecture for central processing units (CPUs). Such instruction sets often include masked lane capabilities whereby a special register or other storage element is used to store a mask that specifies which lanes are to be excluded during execution of the SIMD operation represented by a corresponding instruction that utilizes the mask.

Such masked multi-lane instructions, as with many instructions, are subject to page faults or other memory faults. To illustrate, some or all of the memory block referenced in the instruction could be in a non-resident page, thereby triggering a page fault when a load of the memory block is attempted or a store to the memory block is attempted. One conventional approach to dealing with potential memory faults for masked multi-lane instructions is to always perform a load or store operation for each lane whenever a masked multi-lane instruction is dispatched for execution, regardless of whether the lane is included or excluded from the operation based on the associated mask. However, this approach requires a relatively large, fixed number of load or store operations to be performed before the SIMD operation of the instruction can be performed, regardless of the number of lanes enabled by the associated mask. For example, assuming a 16-lane SIMD operation, 16 load or store operations would need to be performed before executing the SIMD operation itself, even if only one lane is enabled by the corresponding mask. Another conventional approach is to provide the mask to the address generation unit and load/store unit so that address generation and corresponding load/store operation can be implemented only for those enabled lanes as determined from the mask. However, this approach requires complicated coordination between the integer unit that provides the address generation capabilities and the floating point unit that executes the SIMD operation, as well as a more complicated address generation process in view of dependencies between the generated addresses, the mask, and the load/store operations.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
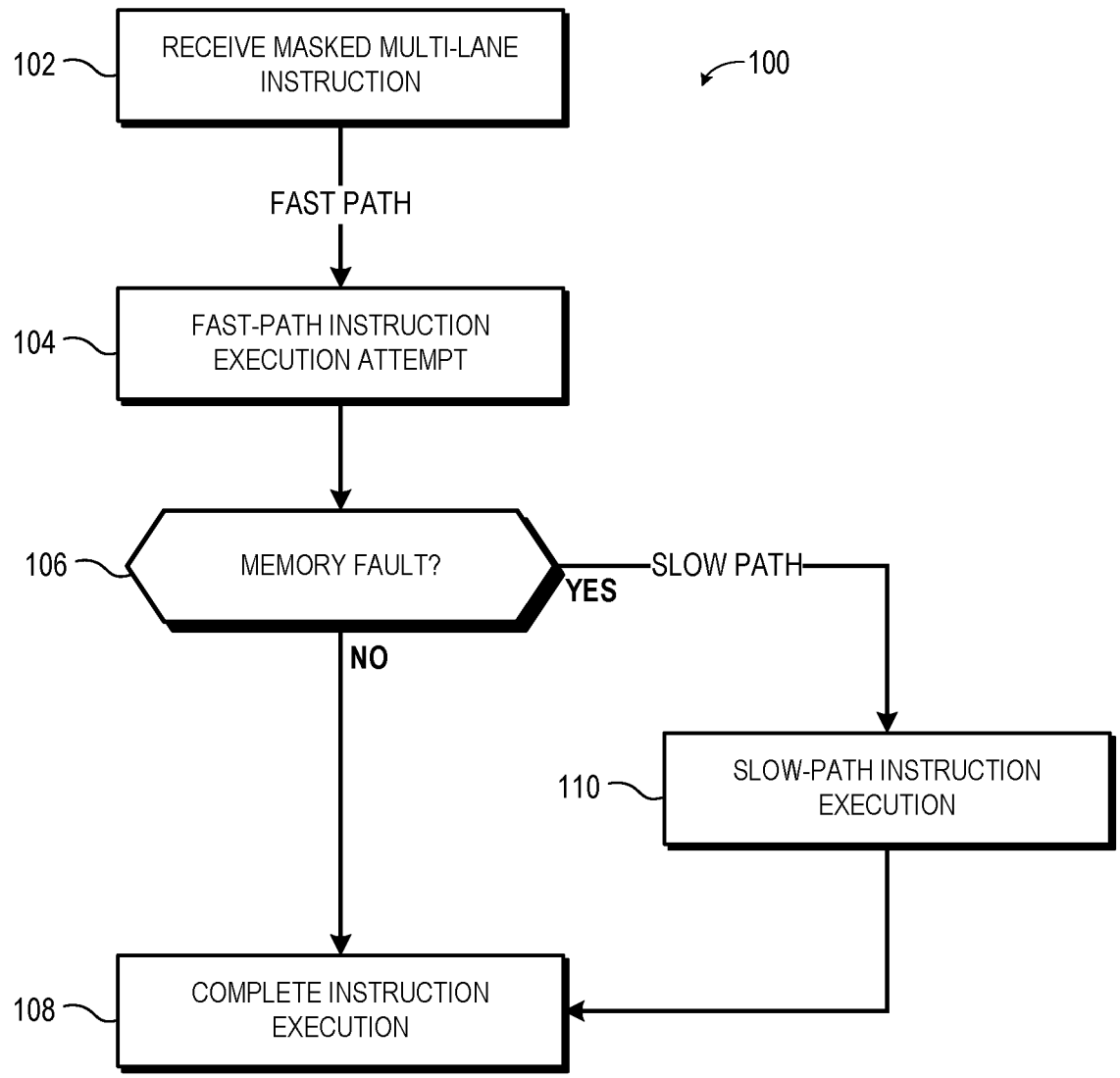
FIG. 1 is a flow diagram illustrating a method for fast-path/slow-path execution of a masked multi-lane instruction at a processor in accordance with some embodiments.

Attempts to load a memory block referenced as a source of operand data using a single load operation or attempts to store results data to a memory block referenced as a destination using a single store operation for a masked multiple-lane, or SIMD, instruction can result in a memory fault when, for example, the memory block includes a page not yet resident in memory. However, such instances in which a memory fault is triggered are relatively rare in typical execution environments. In at least one embodiment, a processor leverages the relative rarity of such memory faults by initially attempting to execute a masked multiple-lane instruction in a fast-path execution mode by performing a single load operation or a single store operation (depending on whether the instruction requires a load or a store) to access the memory block in its entirety. If no memory fault is triggered by this single load or store attempt, then execution of the instruction continues and completes in the fast-path execution mode.

However, if a page fault or other memory fault is triggered by the single load or single store operation, then the processor ceases execution of the instruction in the fast-path execution mode and switches instead to a slow-path execution mode for re-execution of the instruction. In the slow-path mode, for a load-including instruction, a microcode preamble composed of an individual load operation for each enabled lane of a plurality of lanes for the SIMD operation is dispatched and performed so that the operand data is loaded lane-by-lane, and any memory faults arising for a given lane/load operation of the preamble can be addressed accordingly. For a store-including instruction, a microcode postamble composed of an individual store operation for each enabled lane is performed so that the result data is stored lane-by-lane, and any memory faults triggered for a given lane/store operation can be addressed accordingly. Alternatively, rather than using a microcode preamble or postamble, in other embodiments the instruction can have two different decodings: one decoding (i.e., "entry point") for the fast-path execution mode in which a single load operation or store operation is generated as part of the decoding process, and another decoding (or other "entry point") for the slow-path execution mode in which a separate load operation or separate store operation is dispatched for each enabled lane.

Thus, assuming a sufficiently high proportion of masked multiple-lane instructions that do not trigger a memory fault to those that do trigger a memory fault, initially attempting the fast-path execution mode for each masked multiple-lane instruction and then reattempting execution via the slow-path execution mode when a memory fault is triggered typically results in faster and more efficient execution, on average, compared to conventional approaches which default to lane-by-lane load/store operations or which utilize complex and costly specialized address generation logic needed to resolve the dependencies between the address generation process and the mask vector that identified which lanes are enabled and which are disabled.

FIG. 1 illustrates an example method 100 for efficient execution of a masked multiple-lane ("multi-lane") instruction at a single-instruction-multiple-data (SIMD)-enabled central processing unit (CPU) or other processor. A masked multi-lane instruction includes any of a variety of instructions that, when executed, cause the same single-instruction-multiple-data (SIMD) operation to be performed in parallel on multiple separate sets of data, referred to as "lanes", where any given lane position can be included or excluded from inclusion in the operation based on a corresponding bit position in a mask vector, which typically is stored in a mask register or other storage component. To illustrate, the AVX-512 instruction set provides for multi-lane instructions that result in execution of one or more SIMD operations on a memory block of 512 bits, or 64 bytes, and with a mask register kX[16] storing a mask vector (or "opmask" in the parlance of the AVX-512 specification) of 16 bits (X=0 . . . 7). This mask register thus allows control of execution of the SIMD operation for each lane of 16 lanes, each using a corresponding 32-bit sub-block of 512-bit memory block as an operand in the corresponding SIMD operation.

Typically, when executing instructions of a program, stream, or thread, each instruction is fetched from memory or an instruction cache and initial preprocessing of the fetched instruction is performed. In method 100, this includes fetching or otherwise receiving a masked multi-lane instruction for execution by an execution pipeline of the processor at block 102. This masked multi-lane instruction includes at least one of: reference to a memory location as a source of operand data for the corresponding SIMD operation (a "load-based" instruction), and thus leading to a load operation to load or access the memory block located at the referenced memory location; reference to a memory location as a destination of a lane-by-lane result data generated by the corresponding SIMD operation (a "store-including" instruction), and thus leading to a store operation to store the results of the SIMD operation to the referenced memory location; or a combination of both memory location as source and memory location as destination, and thus leading to both a load operation and a store operation.

At block 104, the execution pipeline of the processor first attempts execution of the masked multi-lane instruction in "fast-path" execution mode by decoding the instruction and issuing the resulting SIMD operation(s) to a SIMD or floating point unit while in parallel generating at an integer unit a base memory address for the memory location referenced by the instruction. This memory generation process is performed without using the mask vector referenced by the instruction (that is, without requiring a mechanism to make the mask vector available to the address generation unit of the integer unit). If the memory operation is a load operation, at block 106 a load/store unit of the processor attempts to perform a load operation to access the memory block located at the base memory address. Otherwise, if the memory operation is a store operation, the SIMD/floating point unit executes the SIMD operations represented by the instruction and the load/store unit attempts to store the results at a memory block located at the base memory address. If the load/store unit does not encounter a memory fault during the attempt to perform the load operation or store operation, then at block 108 the processor completes execution of the instruction. If a load operation was involved, then completion of execution includes performing the SIMD operation in parallel for each lane of the loaded memory block that is enabled for inclusion based on the mask vector, and then retiring the instruction. If a store operation was involved, then the SIMD operation was previously performed prior to the store operation, and thus completion of execution includes completing the store operation for storing the result data to the memory location, and then retiring the instruction.

However, if a memory fault is encountered while attempting to perform the memory operation (e.g., while attempting to generate the generated base memory address), then the processor switches from a fast-path execution mode to a slow-path execution mode for the masked multi-lane instruction. In the slow-path execution mode, at block 110 the processor initiates a pipeline restart (also known as a resynchronization or "resync") of the masked multi-lane instruction, along with a signal or other indication that the pipeline restart was triggered by a memory fault.

When a failed load is involved, rather than re-attempt a load of the entire memory block, the decode stage of the execution pipeline uses the mask vector to identify the enabled lanes, and then dispatches a separate load operation for each enabled lane. A base memory address is generated for each single-lane load operation, and the load/store unit performs each single-lane load operation using the corresponding base address (and handles any memory faults that can arise using conventional fault recovery processes) to load the sub-blocks at different positions in the memory block that are required as operand data to perform the parallel SIMD operations for the enabled lanes to a scratchpad memory, cache, temporary register, or other temporary storage location. The dispatch stage also again dispatches the SIMD operation to the SIMD/floating point unit, but with the original referenced memory location replaced by a reference to the temporary storage location containing the loaded operand data. The SIMD/floating point unit executes the SIMD operation using the loaded operand data from the temporary storage location. Similarly, when a failed store attempt is involved, rather than re-attempt a store of the entire memory block, the decode stage again dispatches the SIMD operation to the SIMD/floating point unit for execution, but replaces the original memory reference with a reference to a temporary storage location. The decode stage follows the SIMD operation with a store operation for each enabled lane, with each single-lane store operation referencing a position in the temporary storage location corresponding to the associated enabled lane and having a destination memory address generated for the corresponding lane. Thus, after completion of execution of the SIMD operation, the load/store unit performs each store operation in sequence to store the result data for a corresponding lane to a corresponding location in memory. Thereafter, whether the memory operation is a store operation or load operation, at block 108 execution of the instruction is completed as discussed above.

Thus, as method 100 demonstrates, in executing a masked multi-lane instruction, the processor takes a speculative approach by first implementing the fast-path execution mode whereby a memory operation (load or store) for the referenced memory block containing operand data for all lanes (for an involved load) or containing result data and/or null values for all lanes (for an involved store) is attempted without consideration of the mask vector and under an assumption that a memory fault will not occur. If a memory fault does occur during the fast-path attempt, then the processor reverts to the slow-path execution mode whereby each lane is accorded its own memory operation in order to identify the source of the memory fault and process the memory fault on a lane-by-lane basis. However, while this fast-path/slow-path approach can result in additional processing effort and delay in the event that a memory fault is present compared to the conventional approach of always initiating execution using lane-by-lane memory operations, such memory faults generally are relatively rare in typical workloads, and thus the improved efficiency of avoiding per-lane memory operations using the fast path mode when no memory fault will result from the single memory operation for the entire memory block typically more than compensates for the occasional inefficiency caused by having to revert to the slow-path mode for a relatively small number of instances where a memory fault does occur.

Figure 2:
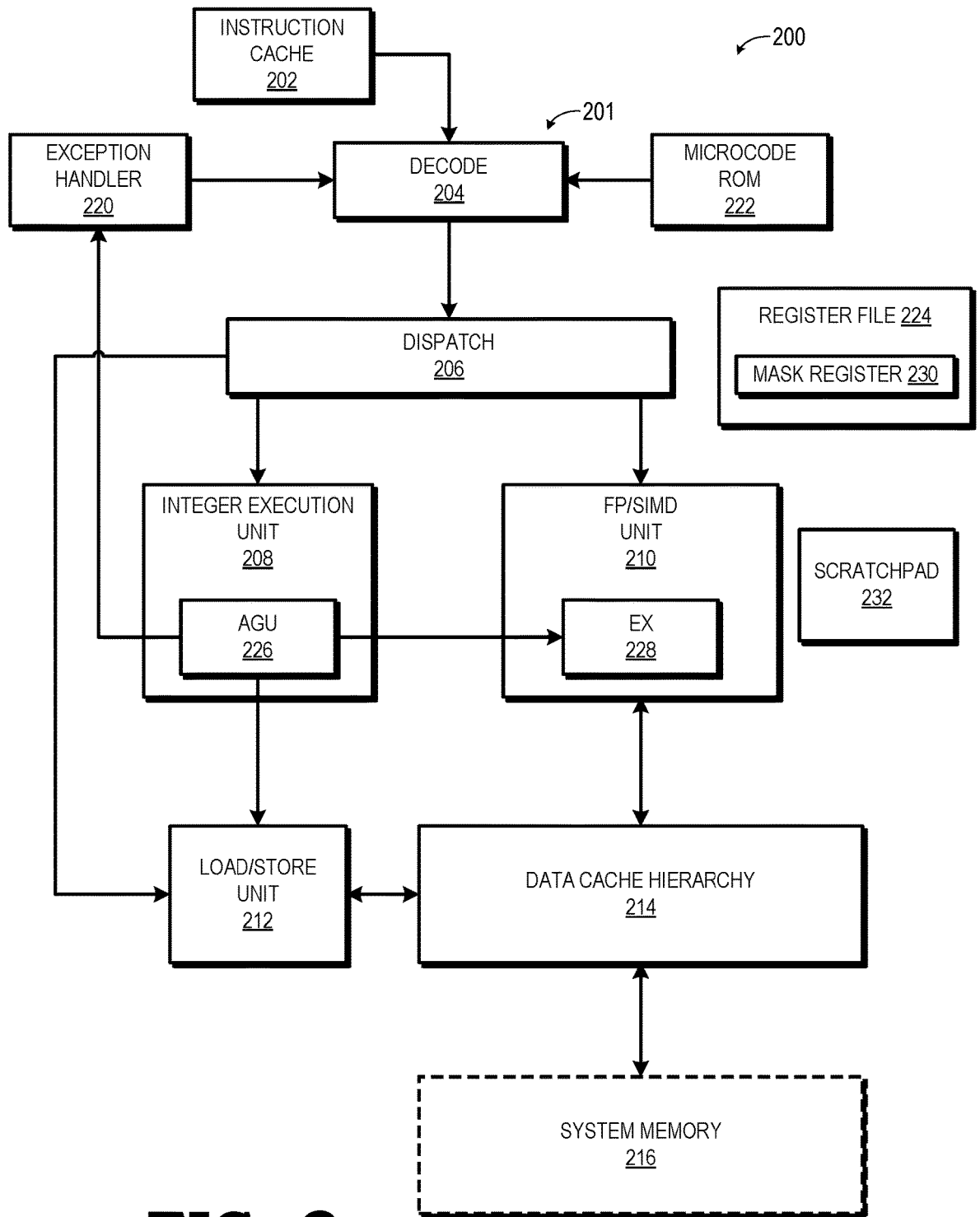
FIG. 2 is a block diagram illustrating a processor to execute a masked multi-lane instruction with fast-path and slow-path execution mode options in accordance with some embodiments.

FIG. 2 illustrates an example implementation of a processor 200 operable to provide the fast-path/slow-path execution modes for a masked multi-lane instruction in accordance with some embodiments. The processor 200 includes an execution pipeline 201 composed of an instruction cache 202, a decode stage 204, a dispatch stage 206, at least one integer execution unit 208, and at least one floating point (FP)/SIMD unit 210. The processor 200 further includes a load/store unit 212, a data cache hierarchy 214 (which can in turn be coupled via a memory controller (not shown) to an external system memory 216), an exception handler 220, a microcode read-only memory (ROM) 222, and a register file 224.

The instruction cache 202 operates to store a subset of executable instructions fetched from the system memory 216 or from mass storage for a thread, stream or program. The decode stage 204 operates to retrieve a stream of executable instructions from the instruction cache 202, and for each instruction, decode the instruction to generate a sequence of instruction operations, each typically represented by an opcode and with references to immediate values, registers of the register file 224, memory locations, or combinations thereof. In decoding an instruction, the decode stage 204 can make use of microcode operations stored in the microcode ROM 222, which can include use of a microcode-based preamble or a microcode-based postamble for implementing per-lane load operations or per-lane store operations, respectively, during a slow-path execution mode, as described below. The dispatch stage 206 dispatches memory operations to the load/store unit 212 and dispatches instruction operations to the execution units 208, 210, with integer operations being dispatched to the integer execution unit 208 for execution, and floating point and SIMD operations being dispatched to the FP/SIMD unit 210. The integer execution unit 208 includes one or more address generation units (AGUs) 226 that operate to generate addresses for the memory operations, including load operations and store operations, performed by the load/store unit 212 to load the data used in execution of the instruction operations or to store the result data generated by execution of the instruction operations. This address generation process typically includes the use of one or more translation lookaside buffers (TLBs) and page tables (omitted from FIG. 2 for clarity) during a corresponding address translation process. The FP/SIMD unit 210 includes one or more execution units (EX) 228 to execute instruction operations.

The data cache hierarchy 214 includes one or more caches (e.g., a level 1 (L1) cache, a level 2 (L2) cache, etc.) to temporarily buffer data that is one or both of used as operands in executing instruction operations or represents the result data generated by the execution of instruction operations. For load operations, unless the load operation is non-temporal, the load/store unit 212 typically performs a lookup in the data cache hierarchy 214 to determine whether a copy of the sought-after data is present in a cache, and if so, the data can be copied from the cache to a register or, in some implementations, accessed directly from the cache during instruction operation execution. In the event that the data is not cached, then the load/store unit 212 performs a memory access operation to access the sought-after data from the system memory 216. For store operations, unless the store operation is non-temporal, the load/store unit 212 provides store data to the data cache hierarchy 214 for temporary storage, and when the data is flushed from the cache hierarchy 214, a copy of the flushed data is then saved to a corresponding location in system memory 216.

In the process of performing memory operations, the AGU 226 or load/store unit 212 can encounter one or more memory faults. Typically, such memory faults pertain to the target memory location not being present in the currently mapped memory pages, and thus lacking a page table entry in a TLB or page table that can be used to provide the necessary address translation. To illustrate in the context of a multi-lane instruction, the memory block that covers all lanes utilized by the instruction can span two pages of memory, with one page being resident in system memory 216 and the other page being non-resident. As such, in this example an attempt to load the memory block using a single load instruction with a base memory address would result in a page fault due to the current unavailability of the non-resident page. Accordingly, in at least one embodiment, the processor 200 utilizes the exception handler 220 to process exceptions generated within the processor 200, including memory faults generated by the AGU 226 or the load/store unit 212. Generally, for many types of page faults, the exception handler 220 identifies the missing page, provides for the missing page to be loaded into system memory 216, and provides for insertion of a corresponding page table entry, thus allowing generation of a translated address and allowing the load/store unit 212 to attempt the memory operation again with the page now resident in memory. However, for multi-lane instructions, and masked multi-lane instructions in particular, the exception handler 220 cannot address a memory fault triggered by the load/store unit 212 in the same manner because the instructions are implemented so as to only take exceptions for lanes that are enabled, but in the fast-path execution mode the mask vector is not available for address generation, and thus it is not known which lanes are enabled or not with respect to an exception.

As noted herein, the mask vector employed by a masked multi-lane instruction typically is stored in a mask register 230, which is part of, or separate from, the register file 224. To illustrate, the AVX-512 instruction set provides for eight "opmask" registers, designated k0-k7, with opmask register k0 being a hardcoded constant used to indicate unmasked operations and each of the remaining opmask registers k1-k7 storing a 16-bit mask vector, with each bit position representing a corresponding lane such that when the bit position is set to "1", the lane is enabled for inclusion in the corresponding operation and when the bit position is set to "0", the lane is excluded in the corresponding operation. In one embodiment, the mask register 230, and mask vector stored therein, has a similar implementation, with each bit position associated with a corresponding lane and the bit value at each bit position controlling whether the corresponding lane is included or excluded from the instruction operation that references the mask vector.

Figure 3:
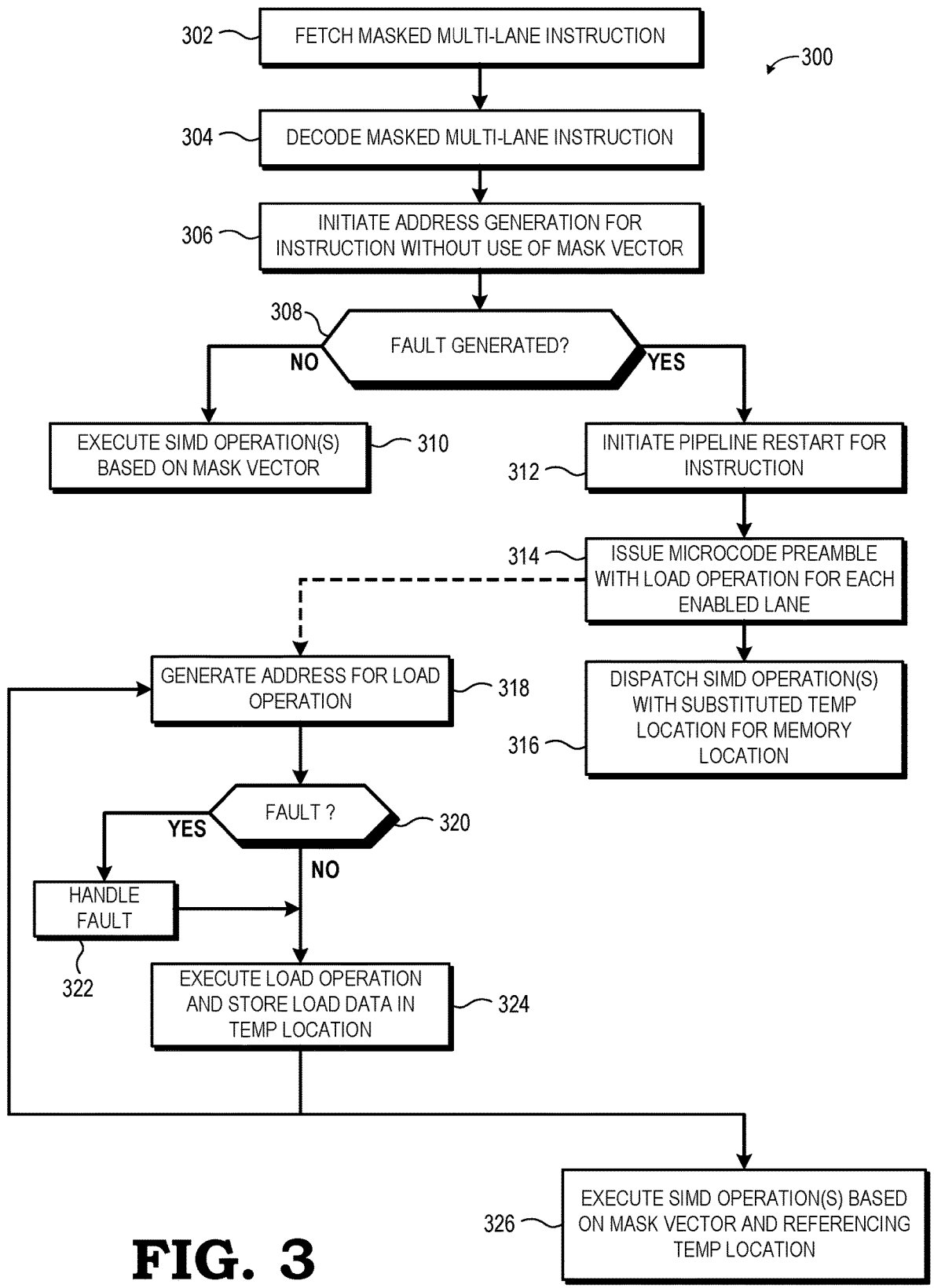
FIG. 3 is a flow diagram illustrating an implementation of the method of FIG. 1 using the processor of FIG. 2 for executing a masked multi-lane instruction that relies on loading of operand data in accordance with some embodiments.

FIG. 3 illustrates a method 300 that represents a more detailed implementation of the method 100 at the processor 200 for fast-path/slow-path execution of a masked multi-lane instruction that relies on a load of a memory block that serves as operands for each enabled lane in accordance with some embodiments. The method 300 initiates at block 302 when a load-including masked multi-lane instruction is fetched from the instruction cache 202. Typically, the syntax of the instruction includes reference to at least one SIMD operation to be performed in parallel for each lane of one or more enabled lanes, reference to a source memory location storing a memory block that contains data representing operands for the SIMD operation to be performed for each lane, reference to the particular mask register 230 storing the mask vector that specifies which lanes are enabled and which lanes are disabled for executing the instruction and, depending on the SIMD operation, reference to one or more register or immediate values that serve as the source of operand data, reference to a register that serves as the destination register for the results of the SIMD operation, and the like.

At block 304, the decode stage 204 decodes the instruction into a load operation or other signaling for the load/store unit 212 for loading the referenced memory block that represents operand data for each enabled lane, as well as one or more SIMD operations (typically represented by a corresponding opcode). The load operation is distributed to the load/store unit 212 and the dispatch stage 206 dispatches the one or more SIMD operations to the FP/SIMD unit 210 for execution by the EX unit 228. Further, at block 306 the processor 200 initiates address generation for the load operation by providing the source memory location referenced in the fetched instruction to the AGU 226 of the integer execution unit 208. The AGU 226 uses the referenced source memory location to attempt to generate a corresponding source address for the memory block to be accessed for the instruction. In at least one embodiment, the source memory location is a virtual address, or portion thereof, and the generated source address is a base physical memory address for the memory block generated via a memory address translation process utilizing one or more TLBs or page tables.

With the generated memory address, the load/store unit 212 attempts to load the memory block associated with the generated source address. In attempting to perform the load operation, any of a variety of memory faults are possible, such as a page fault due to the memory block including a portion of a page that is not resident in memory or otherwise not represented in the corresponding page tables, segmentation faults, breakpoints, non-cacheable memory, and the like. Accordingly, at block 308 the exception handler 220 monitors for a memory fault triggered while attempting the address generation process or attempting the load operation with a generated address. In the event that no memory fault is triggered, the load operation completes (e.g., by storing the data of the memory block in one or more registers or other temporary storage locations) and the load/store unit 212 signals that the referenced memory block is available for use. In response to absence of a memory fault, the processor 200 continues with the fast-path execution mode. Accordingly, at block 310 the EX unit 228 executes the one or more dispatched SIMD operations for the instruction using the data of the referenced memory block, where execution of each SIMD operation is performed on a lane-by-lane basis according to which lanes are enabled and which lanes are disabled as controlled by the mask vector associated with the instruction.

Otherwise, in response to detecting the triggering of a memory fault at block 308, the processor 200 switches to the slow-path execution mode for the instruction. Accordingly, at block 312 the exception handler 220 or other component triggers a pipeline restart or resynchronization ("resync") for the masked multi-lane instruction, which serves to "rewind" the instruction execution pipeline for the masked multi-lane instruction and any subsequent dependent instructions decoded or dispatched thereafter. In response to the pipeline restart, the decode stage 204 reprocesses the masked multi-lane instruction for execution in the slow-path execution mode. As described above, the slow-path execution mode can be implemented using different decodings of the masked multi-lane instruction for fast-path mode and slow-path mode, or a microcode preamble can precede the same decoded instruction operations in the slow path mode. For purposes of the following description, it is assumed that a microcode preamble is implemented. However, the same principles described herein can be applied for implementations in which a different slow-path decoding is employed to provide enabled lane-by-lane loading of the memory block. Thus, in the slow-path execution mode, the load-including masked multi-lane instruction is decoded as a microcode preamble composed of series of one or more load operations, one load operation for each enabled lane with a corresponding address generation, followed by the one or more SIMD operations that are modified to reference a temporary location into which the load operations load their corresponding data.

Accordingly, at block 314, the decode stage 204 accesses the microcode ROM 222 and the mask vector referenced by the masked multi-lane instruction to produce a microcode preamble that performs the load operation on a lane-by-lane basis. In at least one embodiment, this microcode preamble is composed of a microcode load operation for each enabled lane indicated by the masked vector. Further, in one embodiment, each microcode load operation of the microcode preamble is constructed to direct the load of the corresponding data into a specified location of a scratchpad memory 232 (FIG. 2), which serves as an emulated memory (EMEM) accessible by microcode operations executed by the FP/SIMD unit 210. The preamble is a sequence of micro-ops. For example, for an implementation with four lanes of eight bytes each, an example opcode preamble for the instruction: Lea t0, [GAM]; load effective address to temporary register, could invoke the following microcode preamble sequence for slow-path execution mode (with 4 lanes with 8 byte offsets increasing for each lane, and then the instruction can load all 32 bytes from EMEM):

```
Load8B ft0, [t0 + 0]
Store8B [PREAMBLE_EMEM + 0], ft0
Load8B ft0, [t0 + 8]
Store8B [PREAMBLE_EMEM + 8], ft0
Load8B ft0, [t0 + 16]
Store8B [PREAMBLE_EMEM + 16], ft0
Load8B ft0, [t0 + 24]
Store8B [PREAMBLE_EMEM + 24], ft0
```

The microcode operations of the microcode preamble are then dispatched to the load/store unit 212 for further processing. Further, during the slow-path decode of the masked multi-lane instruction, at block 316 the decode stage 204 issues the one or more SIMD operations represented in the instruction. However, for the slow path mode, the SIMD operations are modified to replace the original memory location reference with a reference to the temporary storage location in the scratchpad memory 232 that serves as the destination location for the load operations of the microcode preamble. The dispatch stage 206 then dispatches the one or more modified SIMD operations to the FP/SIMD unit 210 for execution.

For each load operation of the microcode preamble, at block 318 the AGU 226 attempts to generate a corresponding source memory address. If a fault is detected (block 320) during the address generation process, then at block 322 the exception handler 220 handles the fault so that the load operation can proceed to completion. To illustrate, if there is a page fault during address generation because the page associated with the referenced memory location is not resident in memory, then the exception handler 220 acts to direct the loading of the referenced memory location into memory and to configure the corresponding TLB and page tables to reflect the loaded page for address translation purposes. Otherwise, if no fault is generated or if all faults have been handled, at block 324 the load/store unit 212 performs the load operation using the generated source memory address and stores the resulting loaded data to the specified temporary location in the scratchpad memory 232, with "0" being loaded to the temporary location associated with a disabled lane. The load process of blocks 318-324 is repeated for each microcode load operation in the microcode preamble; that is, for each enabled lane as indicated by the mask vector.

When the load operations of the microcode preamble have completed, the memory block referenced by the masked multi-lane instruction is available for use. Accordingly, after the microcode preamble has been executed, at block 326 the EX unit 228 of the FP/SIMD unit 210 executes the one or more dispatched SIMD operations for each enabled lane in parallel using operand data for each lane accessed from a corresponding portion or segment of the temporary location in the scratchpad memory 232 used as the destination for the load data from the microcode preamble. When execution of the one or more SIMD operations completes, the masked multi-lane instruction is then retired.

Figure 4:
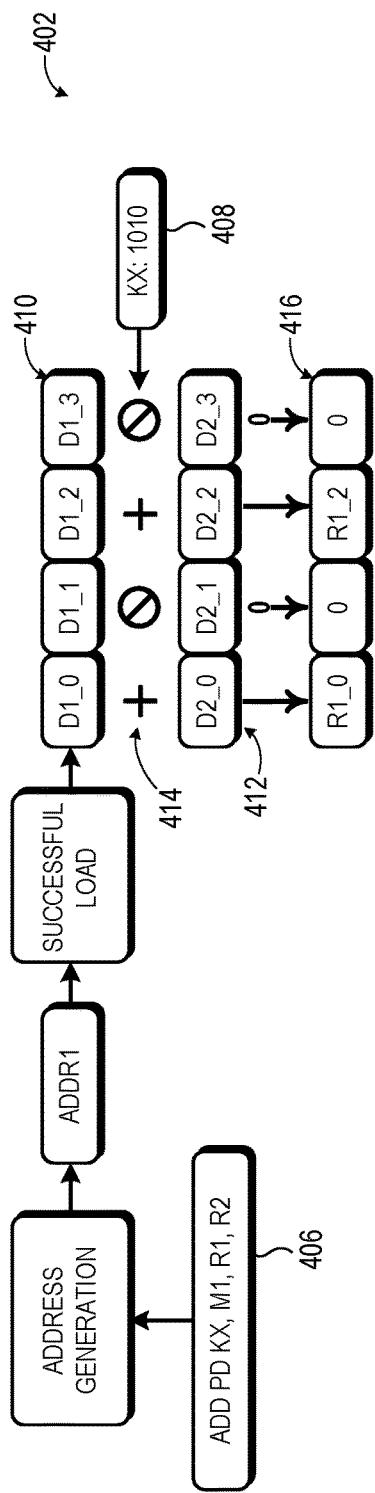
FIG. 4 is a diagram illustrating a fast path-only example and a fast path-slow path example of the method of FIG. 3 in accordance with some embodiments.
Figure 4:
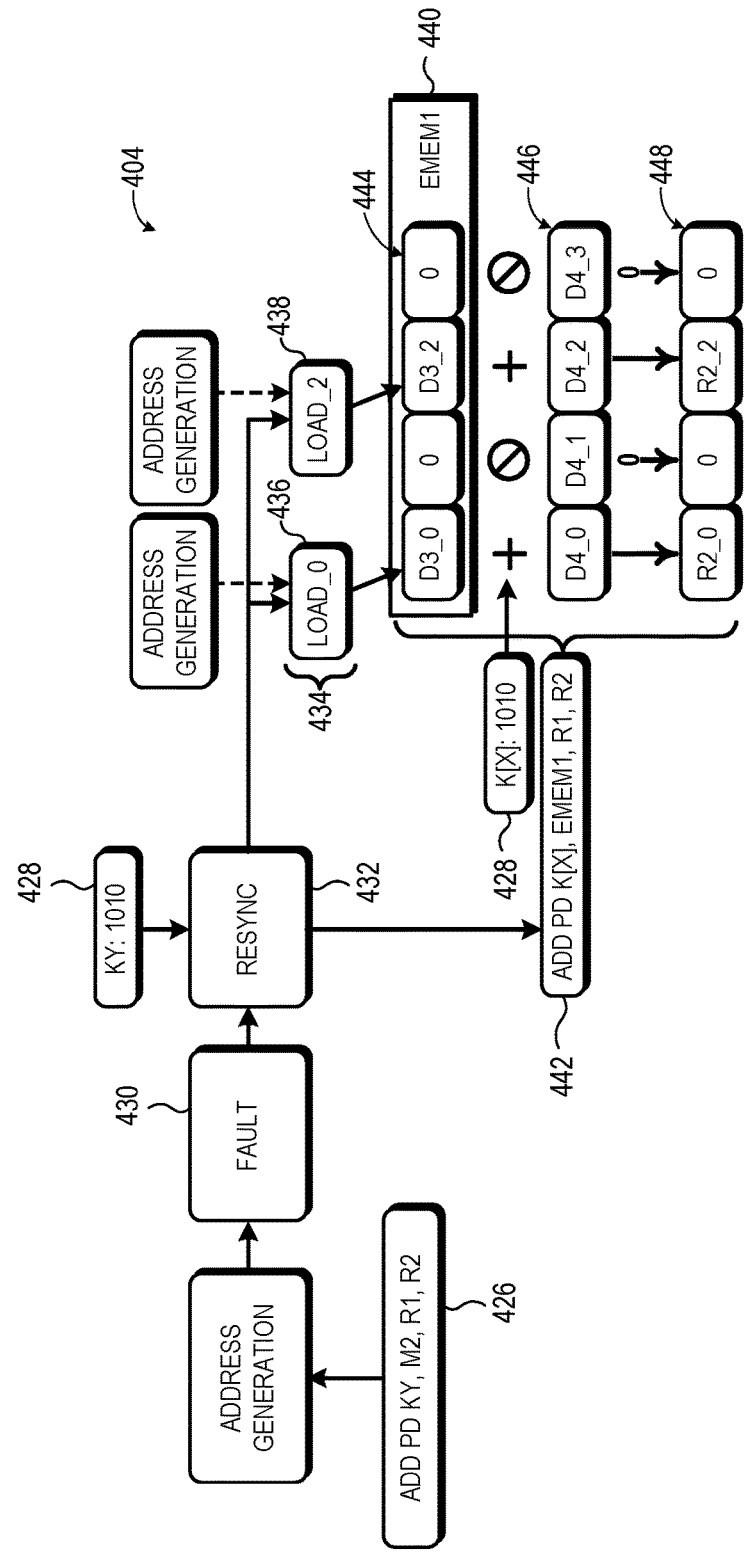

FIG. 4 illustrates two different examples 402, 404 of the fast-path/slow-path execution approach for masked multi-lane instructions as represented by method 300 of FIG. 3. Example 402 represents a scenario in which a masked multi-lane instruction does not trigger any memory faults during processing, and thus executes solely via the fast-path execution mode. In this example, the decode stage 204 receives a masked multi-lane instruction 406 representing a lane-by-lane packed double ADD operation utilizing a memory block at memory location M1 as storing the per-lane source operands and referencing a mask vector 408 stored in register KX (register 230). In this example, there are four lanes (lanes 0-3) and the mask vector 408 has a value "1010" and thus identifies lanes 0 and 2 as enabled and lanes 1 and 3 as disabled. The instruction 406 is decoded into a single load operation to load the memory block at location M1 and a SIMD operation 414 to perform the ADD operation for enabled lanes 0 and 2 using the corresponding portions of the loaded memory block as source operands. In this case, the referenced memory block is resident in memory and in the same page, and thus the AGU 226 is able to generate a corresponding physical address ADDR1 from the memory location M1 and the load/store unit 212 is able to successfully load the memory block using the generated physical address ADDR1, resulting in memory block 410 loaded and available for use.

The memory block has four data portions, D1_0, D1_1, D1_2, and D1_3, each corresponding to a different one of the lane positions 0, 1, 2, and 3. Similarly, the source register R1 referenced by the instruction 406 stores a data block 412 with four data portions, D2_0, D2_1, D2_2, and D2_3, each corresponding to one of lanes 0-3. Accordingly, with only lanes 0 and 2 enabled, when the FP/SIMD unit 210 performs the ADD operation (SIMD operation 414), data portion D1_0 and D2_0 are added together and the result is stored as data portion R1_0 of a data block 416 stored in the destination register R2, data portion D1_2 and D2_2 are added together and the result is stored as data portion R1_2 of the data block 416, and a value of 0 is stored in each of the portions of the data block 416 corresponding to lanes 1 and 3 as these lanes are identified as disabled by the mask vector 408.

Example 404 represents a scenario in which a masked multi-lane instruction triggers a memory fault during fast-path execution mode, and in response the processor 200 turns instead to the slow-path execution mode for the instruction. In this example, the decode stage 204 receives a masked multi-lane instruction 426 representing a lane-by-lane packed double ADD operation utilizing a memory block at memory location M2 as the source of the per-lane source operands and referencing a mask vector 428 stored in register KY (register 230). In this example, the mask vector 428 has a value "1010" and thus identifies lanes 0 and 2 as enabled and lanes 1 and 3 as disabled. The instruction 426 is initially decoded into a single load operation to load the memory block at location M2 and a SIMD operation to perform the ADD operation for enabled lanes 0 and 2 using the corresponding portions of the loaded memory block as source operands. In this case, the referenced memory block references a page not resident in memory, and thus an attempt by the AGU 226 to generate a physical address from the memory location M2 triggers a memory fault 430, which in turn triggers a pipeline restart 432 for the instruction 426. In response, the processor 200 switches to slow-path execution mode for the instruction 426. Accordingly, based on the mask vector 428 the decode stage 204 generates a microcode preamble 434 that has a load operation 436 (LOAD_0) for loading the data at the referenced memory location to be used for enabled lane 0 and a load operation 438 (LOAD_2) to be used for enabled lane 2. Each of these load operations 436, 438 is formed with a source location referencing the portion of the memory block associated with the corresponding lane, and load target location EMEM1 (location 440) of the scratchpad memory 232 that is to serve as the temporary storage location for storing the loaded data. Accordingly, the decode stage 204 alters instruction 426 to refer to the target location EMEM1 in place of the memory location M2, and provides the resulting SIMD operation 442 for dispatch to the FP/SIMD unit 210.

As shown, the AGU 226 performs the address generation process for each of the load operations 436, 438. For this example, assume that an address is generated for the load operation 436 without triggering a memory fault, but the address generation process for the load 438 triggers a memory fault, and thus causing the exception handler 220 to manage the loading of the absent page into memory so that memory address generation is able to proceed. The load/store unit 212 thus performs each of the load operations 436, 438, resulting in a data block 444 being loaded to the temporary location 440 in scratchpad memory 232, with a data portion D3_0 storing the data loaded for lane 0 via the load operation 436 and a data portion D3_2 storing the data loaded for lane 2 via the load operation 438, and data portions D3_1 and D3_3 storing "0" or null values as a result of lanes 1 and 3 being disabled by mask vector 428. Thereafter, the SIMD operation 442 is executed. For lane 0, the data portion D3_0 and a corresponding data portion D4_0 of a data block 446 stored in a source register R1 are added, and the result is stored as data portion R2_0 of a data block 448 generated in destination register R2. For lane 2, the data portion D3_2 and a corresponding data portion D4_2 of data block 446 are added, and the result is stored as a data portion R2_2 of the data block 448. As for lanes 1 and 3, because these lanes are disabled by masked vector 428, the FP/SIMD unit 210 stores the value of "0" in the data portions of the data block 448 corresponding to these two disabled lanes. The instruction 426 is then retired and completed.

Figure 5:
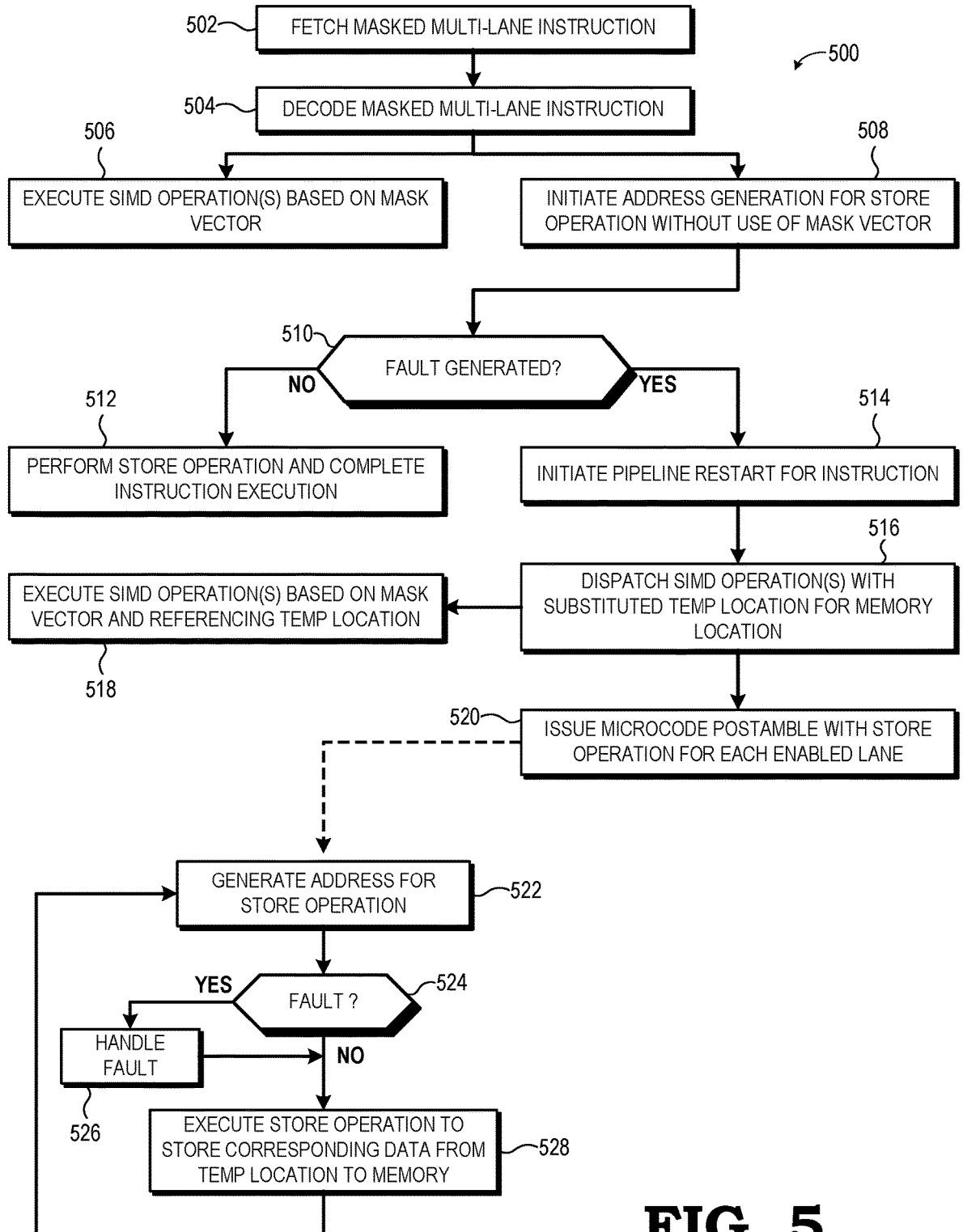
FIG. 5 is a flow diagram illustrating an implementation of the method of FIG. 1 using the processor of FIG. 2 for executing masked multi-lane instructions that rely on storing of result data in accordance with some embodiments.

FIG. 5 illustrates a method 500 that represents a more detailed implementation of the method 100 at the processor 200 for fast-path/slow-path execution of a store-including masked multi-lane instruction that relies on a store of a memory block that is to contain the operation results for each enabled lane in accordance with some embodiments. The method 500 initiates at block 502 when a store-including masked multi-lane instruction is fetched from the instruction cache 202. Typically, the syntax of the instruction includes reference to at least one SIMD operation to be performed in parallel for each lane of one or more enabled lanes, reference to one or more source registers or memory locations storing data representing operands for the SIMD operation to be performed for each enabled lane, reference to the particular mask register 230 storing the mask vector that specifies which lanes are enabled and which are disabled for executing the instruction and, depending on the SIMD operation, reference to a memory location that serves as the destination for storing results of the SIMD operation.

At block 504, the decode stage 204 decodes the instruction into one or more SIMD operations (typically represented by a corresponding opcode) and a store operation for storing results of the one or more SIMD operations. The dispatch stage 206 dispatches the one or more SIMD operations to the FP/SIMD unit 210, and at block 506 the one or more SIMD operations are executed by the EX unit 228 in accordance with the fast-path execution mode, with execution of the one or more SIMD operations being performed on a lane-by-lane basis for those lanes identified as enabled by the mask vector referenced by the masked multi-lane instruction. Concurrently, at block 508 the decode stage 204 distributes the store operation to the load/store unit 212 and the AGU 226 is tasked with generating a memory address for use by the load/store unit 212 in performing the store operation. Accordingly, the destination memory location referenced in the fetched instruction is provided to the AGU 226, which uses the referenced destination memory location to generate a corresponding destination memory address to which the data block containing the results data is to be stored. In at least one embodiment, the destination memory location is a virtual address, or portion thereof, and the generated destination memory address is a base physical memory address for the data block generated via a memory address translation process utilizing one or more TLBs or page tables. As the instruction is being executed in the fast-path execution mode at this point, the AGU 226 generates a single destination memory address for the entire data block without use of the masked vector or other knowledge of which lanes are enabled or disabled.

During the process, the exception handler 220 monitors for any memory faults signaled by the load/store unit 212 or the AGU 226 at block 510. In the event that no memory fault is triggered, the processor 200 continues execution of the instruction in the fast-path execution mode, and thus at block 512 the load/store unit 212 performs the store operation to store the results of the lane-based SIMD operation(s) performed at block 506 to the destination memory address generated at block 508, and with successful completion of this store operation, the store-including masked multi-lane instruction is retired.

Otherwise, in response to detecting the triggering of a memory fault at block 510, the processor 200 switches to the slow-path execution mode for re-execution of the instruction. Accordingly, at block 514 the exception handler 220 or other component triggers a pipeline restart for the masked multi-lane instruction, as similarly described above. In response to the pipeline restart, the decode stage 204 reprocesses the masked multi-lane instruction for execution in the slow-path execution mode. As described above, the slow-path execution mode for a masked multi-lane instruction incorporating a store operation can be implemented using different decodings for fast-path mode and slow-path mode, or a microcode postamble can follow the same decoded instruction operations in the slow-path mode. For purposes of the following description, it is assumed that a microcode postamble is implemented, but the following description can be adapted for a different decoding implementation in which the decoding of the instruction in slow-path execution mode provides for lane-by-lane store operations of the per-lane result data after execution of the one or more SIMD operations. Thus, in the slow-path execution mode, the store-including masked multi-lane instruction is decoded as one or more SIMD operations that are modified to reference a temporary storage location (e.g., in the scratchpad memory 232) as a destination for the results of the one or more SIMD operations, followed by a microcode postamble composed of series of one or more store operations, one store operation for each enabled lane with a corresponding address generation. Accordingly, at block 516 the decode stage 204 decodes the instruction to generate the one or more SIMD operations, but with a temporary location substituted for the destination memory location of the original instruction, and the dispatch stage 206 dispatches the one or more modified SIMD operations to the FP/SIMD unit 210.

At block 518 the EX unit 228 executes the one or more SIMD operations on the enabled lanes indicated by the mask vector in parallel, and stores the results in the temporary location substituted in at block 516. Concurrently, at block 520 the decode stage 204 accesses the microcode ROM 222 and the mask vector referenced by the masked multi-lane instruction to produce a microcode postamble that performs the overall store operation on a lane-by-lane basis. In at least one embodiment, this microcode postamble is composed of a microcode store operation for each enabled lane indicated by the masked vector and is constructed to direct the store of the data from the corresponding portion of the temporary location of the scratchpad memory 232 into a corresponding portion of a memory block identified by the destination memory location identified by the original instruction. The microcode operations of the microcode postamble are then dispatched to the AGU 226 and the load/store unit 212 for further processing.

For each store operation of the microcode postamble, at block 522 the AGU 226 attempts to generate a corresponding target memory address. If a fault is detected (block 524) during the address generation process, then at block 526 the exception handler 220 handles the fault so that the store operation can proceed to completion, such as by initiating the insertion of the corresponding page into system memory 216. Otherwise, if no fault is generated or if all faults have been handled, at block 528 the load/store unit 212 performs the store operation to transfer the corresponding data for the associated enabled lane from the temporary location of the scratchpad memory 232 to the destination memory location in system memory 216 as indicated by the original masked multi-lane instruction. The store process of blocks 522-528 is repeated for each microcode store operation in the microcode postamble; that is, for each enabled lane as indicated by the mask vector. When the store operations of the microcode preamble have completed, the instruction is retired and execution of the masked multi-lane instruction in slow-path execution mode is completed.

Figure 6:
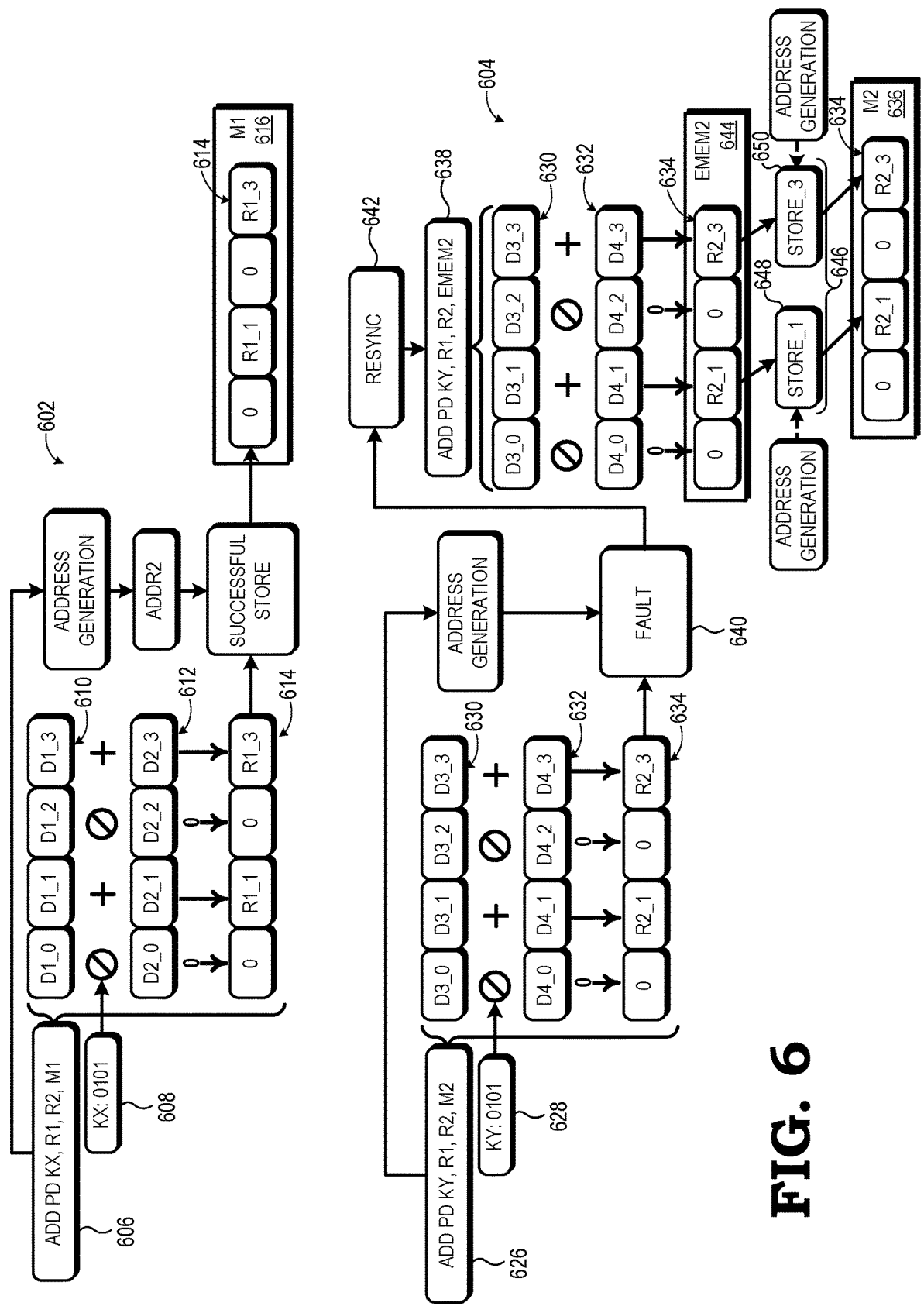
FIG. 6 is a diagram illustrating a fast path-only example and a fast path-slow path example of the method of FIG. 5 in accordance with some embodiments.

FIG. 6 illustrates two different examples 602, 604 of the fast-path/slow-path execution approach for store-including masked multi-lane instructions as represented by method 500 of FIG. 5. Example 602 represents a scenario in which a masked multi-lane instruction does not trigger any memory faults during processing, and thus executes solely via the fast-path execution mode. In this example, the decode stage 204 receives a masked multi-lane instruction 606 representing a lane-by-lane packed double ADD operation that references a memory block at memory location M1 as the destination memory location to store the results of the lane-by-lane add operation and referencing a mask vector 608 stored in register KX (register 230). In this example, there are four lanes (lanes 0-3) and the mask vector 608 has a value "0101" and thus identifies lanes 0 and 2 as disabled and lanes 1 and 3 as enabled. Defaulting to fast-path execution mode, the decode stage 204 decodes the instruction 606 into one or more SIMD operations to perform the ADD operation for enabled lanes 1 and 3 using the corresponding portions of the data blocks 610 and 612 stored in source registers R1, R2, respectively, and a single store operation to store the results data block 614 (which stores the results of the ADD operation for the enabled lanes 1 and 3 and "0"s for the disabled lanes 0 and 2) to the memory block 616 associated with destination memory location M1.

Based on the mask vector 608, the ADD SIMD operation adds the data portion D1_1 of data block 610 with the data portion D2_1 of data block 612 for lane 1 and the resulting sum is temporarily stored as data portion R1_1 of the results data block 614 for lane 1. Likewise, the data portion D1_3 of the data block 610 is summed with the data portion D2_3 of data block 612 for lane 3 and the resulting sum is temporarily stored as data portion R1_3 of data block 614 for lane 3. Because lanes 0 and 2 are disabled for this instruction, the EX unit 228 inserts "0" or another specified value into the data portions of the results data block 614 that correspond to lanes 0 and 2. In this example, the memory block 616 is contained in a single page that is already resident in system memory 216, and thus the AGU 226 is able to generate a corresponding physical address ADDR2 from the memory location M1 and the load/store unit 212 is able to successfully store the results data block 614 using the generated physical address ADDR1, resulting in results data block 614 being successfully stored at the memory block 616 in system memory 216 (or in a cache for subsequent eviction to memory).

Example 604 represents a scenario in which a masked multi-lane instruction triggers a memory fault during fast-path execution, and thus the processor 200 turns to slow-path execution for the instruction. In this example, the decode stage 204 receives a masked multi-lane instruction 626 representing a lane-by-lane packed double ADD operation utilizing a memory block at memory location M2 to store the results of a per-lane addition between source registers R1 and R2, and referencing a mask vector 628 stored in register KY (register 230). In this example, the mask vector 428 has a value "0101" and thus identifies lanes 0 and 2 as disabled and lanes 1 and 3 as enabled. Defaulting to fast-path execution mode, the decode stage 204 decodes the instruction 626 into one or more SIMD operations to perform the ADD operation for enabled lanes 1 and 3 using the corresponding portions of the data blocks 630 and 632 stored in source registers R1, R2, respectively, and a single store operation to store the results data block 634 (which stores the results of the ADD operation for the enabled lanes 1 and 3 and "0"s for the disabled lanes 0 and 2) to a memory block 636 associated with destination memory location M2.

Based on the mask vector 628, the ADD SIMD operation adds the data portion D3_1 of data block 630 with the data portion D4_1 of data block 632 for lane 1 and the resulting sum is temporarily stored as data portion R2_1 of the results data block 634 for lane 1. Likewise, the data portion D3_3 of the data block 630 is summed with the data portion D4_3 of data block 632 for lane 3 and the resulting sum is temporarily stored as data portion R2_3 of data block 634 for lane 3. Because lanes 0 and 2 are disabled for this instruction, the EX unit 228 inserts "0" or another specified value into the data portions of the results data block 634 that correspond to lanes 0 and 2.

In this example, the referenced memory block 636 is contained in a page not resident in memory, and thus an attempt by the AGU 226 to generate a physical address from the memory location M2 triggers a memory fault 640, which in turn triggers a pipeline restart 642 for the instruction 626. In response, the processor 200 changes to slow-path execution mode for the instruction 626. Accordingly, based on the mask vector 628 the decode stage 204 generates one or more SIMD operations (instruction 638) that reference a temporary location EMEM2 (location 644) of the scratchpad memory 232 in place of the original destination memory location M2, and the decode stage 204 further generates a microcode postamble 646 that has a store operation 648 (STORE_1) and a store operation 650 (STORE_3). The store operation 648 is constructed to store result data at the portion of the temporary location EMEM2 corresponding to enabled lane 1 to a corresponding portion of the memory location M2, and the store operation 650 similarly is constructed to store result data at the portion of the temporary location EMEM2 corresponding to enabled lane 3 to a corresponding portion of the memory location M2.

The EX unit 228 executes the one or more SIMD operations in the same manner as described above with reference to the fast-path execution mode, except that the results data block 634 is temporarily stored to the temporary location EMEM2 that is the source location referenced by the store operations 648, 650 of the microcode postamble 646. Accordingly, the AGU 226 performs the address generation process for each of the store operations 648, 650, and the exception handler 220 handles any faults that arise on a lane-by-lane basis. The load/store unit 212 then performs each of the store operations 648, 650, resulting in portions of the data block 634 associated with enabled lanes 1 and 3 being accessed from the temporary location EMEM2 of the scratchpad memory 232 and being stored to corresponding portions of the memory block 636 of system memory 216 referenced by destination memory location M2 and associated with enabled lanes 1 and 3. After these per-lane store operations are completed, slow-path execution of the instruction 626 is completed and the instruction 626 is retired.

In accordance with one aspect, a method includes fetching, at a processor, an instruction that represents a single-instruction-multiple data (SIMD) operation and references a memory block storing operand data for one or more lanes of a plurality of lanes and further references a mask vector indicating, for each lane of a plurality of lanes, whether the lane is enabled or disabled for the SIMD operation. The method further includes attempting execution of the instruction at the processor in a first execution mode in which a single load operation is attempted to access the memory block. The method also includes, responsive to a memory fault resulting from the attempted execution of the instruction, re-executing the instruction at the processor in a second execution mode in which a separate load operation is performed to load the operand data for each enabled lane of the plurality of lanes prior to executing the SIMD operation.

In accordance with another aspect, a processor includes a load/store unit and an execution pipeline configured to execute an instruction in a first execution mode unless a memory fault is generated during the attempt. In response to the memory fault, the execution pipeline is configured to re-execute the instruction in a second execution mode, wherein: the instruction that represents a single-instruction-multiple-data (SIMD) operation and references a memory block storing operand data for one or more lanes of a plurality of lanes and further references a mask vector indicating, for each of lane of a plurality of lanes, whether the lane is enabled or disabled for the operation; in the first execution mode a single load operation is attempted to access the memory block via the load/store unit; and in the second execution mode a separate load operation is performed by the load/store unit for each enabled lane of the plurality of lanes prior to executing the SIMD operation.

In accordance with another aspect, a method includes fetching, at a processor, an instruction that represents a single-instruction-multiple-data (SIMD) operation and references a memory block that is to serve as a destination for result data generated by execution of the SIMD operation for one or more lanes of a plurality of lanes and further references a mask vector indicating, for each of lane of a plurality of lanes, whether the lane is enabled or disabled for the operation. The method further includes attempting to execute the instruction at the processor in a first execution mode in which a single store operation is attempted to store result data to the memory block, and, responsive to a memory fault resulting from the attempted execution of the instruction, re-executing the instruction at the processor in a second execution mode in which a separate store operation is performed for the result data of each enabled lane of the plurality of lanes subsequent to executing the SIMD operation.

In yet another aspect, a processor includes a load/store unit and an execution pipeline configured to execute an instruction in a first execution mode unless a memory fault is generated, and in response to the memory fault, re-execute the instruction in a second execution mode. The instruction represents a single-instruction-multiple-data (SIMD) operation and references a memory block that is to serve as a destination for result data generated by execution of the SIMD operation for one or more lanes of a plurality of lanes and further references a mask vector indicating, for each of lane of a plurality of lanes, whether the lane is enabled or disabled for the operation, in the first execution mode a single store operation is attempted to store result data generated from execution of the SIMD operation to the memory block via the load/store unit, and in the second execution mode a store operation is performed by the load/store unit to store the result data for each enabled lane of the plurality of lanes subsequent to executing the SIMD operation to generate the result data for each enabled lane.

In some embodiments, the apparatus and techniques described above are implemented in a system including one or more integrated circuit (IC) devices (also referred to as integrated circuit packages or microchips), such as the processor 200 described above with reference to FIGS. 1-6. Electronic design automation (EDA) and computer aided design (CAD) software tools often are used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device is either stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

Note that not all of the activities or elements described above in the general description are required, that a portion of a specific activity or device may not be required, and that one or more further activities can be performed, or elements included, in addition to those described. Still further, the order in which activities are listed are not necessarily the order in which they are performed. Also, the concepts have been described with reference to specific embodiments.

However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method, comprising:
    fetching, at a processor, an instruction that represents a single-instruction-multiple data (SIMD) operation and references a memory block storing operand data for each lane of a plurality of lanes and further references a mask vector indicating whether each lane of the plurality of lanes is enabled or disabled for the SIMD operation;
    attempting execution of the instruction at the processor in a first execution mode in which a single load operation is attempted to access the memory block, wherein attempting to execute the instruction at the processor in the first execution mode includes decoding the instruction into the single load operation and the SIMD operation, and attempting to generate a source memory address for the single load operation, wherein the single load operation ignores the mask vector; and
    responsive to a memory fault resulting from the attempt to generate the source memory address, re-executing the instruction at the processor in a second execution mode in which a separate load operation is performed, based on the mask vector, to load the operand data from the memory block for each enabled lane of the plurality of lanes prior to executing the SIMD operation.

2. The method of claim 1, further comprising:
    fetching, at the processor, a second instruction that represents a second SIMD operation and references a second memory block storing operand data for each lane of the plurality of lanes and further references a second mask vector indicating whether each lane of the plurality of lanes is enabled or disabled for the second SIMD operation;
    attempting execution of the second instruction at the processor in the first execution mode in which a second single load operation is attempted to access the second memory block, wherein attempting to execute the second instruction at the processor in the first execution mode includes decoding the second instruction into the second single load operation and the second SIMD operation, and attempting to generate a second source memory address for the second single load operation, wherein the second single load operation ignores the mask vector; and
    responsive to an absence of a memory fault from the attempt to generate the second source memory address:
        completing the second single load operation to load the operand data of the second memory block; and
        performing the second SIMD operation for each enabled lane of the plurality of lanes in parallel using the loaded operand data of the second memory block.

3. The method of claim 2, wherein the memory block comprises the second memory block.

4. The method of claim 1, wherein re-executing the instruction at the processor in the second execution mode comprises:
    implementing a resynchronization for the instruction;
    decoding the instruction into a microcode preamble and the SIMD operation, wherein:
        the microcode preamble includes a load operation for each enabled lane of the plurality of lanes, the load operation configured to load the operand data for a corresponding lane from the memory block to a corresponding position in a temporary storage location; and
        the SIMD operation is configured to reference the temporary storage location in place of a memory location originally identified in the instruction as a source address of the memory block;
    performing each load operation to load the operand data for each enabled lane into the temporary storage location; and
    performing the SIMD operation using the operand data from the temporary storage location.

5. The method of claim 4, wherein the memory fault comprises a page fault responsive to the memory block including a page that is not resident in memory.

6. A processor, comprising:
    a load/store unit; and
    an execution pipeline configured to execute an instruction representing a single-instruction-multiple-data (SIMD) operation in a first execution mode unless a memory fault is generated, wherein the execution pipeline is configured to attempt to execute the instruction in the first execution mode by decoding the instruction into a single load operation and the SIMD operation and attempting to generate a source memory address for the single load operation, and in response to the memory fault to re-execute the instruction in a second execution mode,
    wherein:
        the instruction references a memory block storing operand data for each lane of a plurality of lanes and further references a mask vector indicating whether each lane of the plurality of lanes is enabled or disabled for the SIMD operation;
        in the first execution mode the single load operation is attempted to access the memory block via the load/store unit while ignoring the mask vector; and
        in the second execution mode a separate load operation is attempted, based on the mask vector, to access the memory block and is performed by the load/store unit for each enabled lane of the plurality of lanes prior to executing the SIMD operation.

7. The processor of claim 6, wherein:
    responsive to an absence of a memory fault during execution of the instruction in the first execution mode:

the load/store unit is configured to complete the single load operation to load the operand data; and
an execution unit of the execution pipeline is configured to perform the SIMD operation for each enabled lane of the plurality of lanes in parallel and using the loaded operand data.

8. The processor of claim 6, wherein the execution pipeline is configured to re-execute the instruction at the processor in the second execution mode by:
implementing a resynchronization for the instruction;
decoding the instruction into a microcode preamble and the SIMD operation, wherein:
the microcode preamble includes a load operation for each enabled lane of the plurality of lanes, the load operation configured to load the operand data for a corresponding lane from the memory block to a corresponding position in a temporary storage location; and
the SIMD operation is configured to reference the temporary storage location in place of a memory location originally identified in the instruction as a source address of the memory block;
directing the load/store unit to perform each load operation to load the operand data for each enabled lane into the temporary storage location; and
performing the SIMD operation using the operand data from the temporary storage location.

9. The processor of claim 8, wherein the temporary storage location is in a scratchpad memory of the processor.

10. The processor of claim 8, wherein the SIMD operation is an arithmetic operation.

11. A method, comprising:
fetching, at a processor, an instruction that represents a single-instruction-multiple-data (SIMD) operation and references a memory block that is to serve as a destination for result data generated by execution of the SIMD operation for each lane of a plurality of lanes and further references a mask vector indicating whether each lane of the plurality of lanes is enabled or disabled for the SIMD operation;
attempting to execute the instruction at the processor in a first execution mode in which a single store operation is attempted to store result data to the memory block, wherein attempting to execute the instruction in the first execution mode includes decoding the instruction into the SIMD operation and the single store operation, and attempting to generate a destination address for the single store operation while ignoring the mask vector; and
responsive to a memory fault resulting from the attempt to generate the destination address, re-executing the instruction at the processor in a second execution mode in which a separate store operation is performed, based on the mask vector, to store the result data to the memory block for each enabled lane of the plurality of lanes subsequent to executing the SIMD operation.

12. The method of claim 11, further comprising:
fetching, at the processor, a second instruction that represents a second SIMD operation and references a second memory block that is to serve as a destination for result data generated by execution of the second SIMD operation for each lane of the plurality of lanes and further references a second mask vector indicating whether each lane of the plurality of lanes is enabled or disabled for the second SIMD operation;
attempting to execute the second instruction at the processor in the first execution mode in which a second single store operation is attempted to store result data to the second memory block, wherein attempting to execute the second instruction in the first execution mode includes decoding the second instruction into the second SIMD operation and the second single store operation, and attempting to generate a second destination address for the second single store operation while ignoring the mask vector; and
responsive to an absence of a memory fault from the attempted execution of the second instruction:
performing the second SIMD operation for each enabled lane of the plurality of lanes in parallel to generate corresponding result data for each enabled lane; and
completing the second single store operation to store the result data for every enabled lane to the second memory block.

13. The method of claim 12, wherein the second memory block comprises the memory block.

14. The method of claim 11, wherein re-executing the instruction at the processor in the second execution mode comprises:
implementing a resynchronization for the instruction;
decoding the instruction into the SIMD operation and a microcode postamble, wherein:
the SIMD operation is configured to reference a temporary storage location in place of a memory location originally identified in the instruction as a destination address of the memory block; and
the microcode postamble includes a store operation for each enabled lane of the plurality of lanes, the store operation configured to store the result data from a corresponding position in the temporary storage location to a corresponding portion of the memory block;
performing the SIMD operation to generate the result data for each enabled lane and storing the result data for each enabled lane at a corresponding position at the temporary storage location; and
performing each store operation to store the result data for each enabled lane in the temporary storage location to the memory block.

15. The method of claim 11, wherein the memory fault comprises a page fault responsive to the memory block including a page that is not resident in memory.

16. A processor, comprising:
a load/store unit; and
an execution pipeline configured to execute an instruction representing a single-instruction-multiple-data (SIMD) operation in a first execution mode unless a memory fault is generated, wherein the execution pipeline is configured to attempt to execute the instruction in the first execution mode by decoding the instruction into the SIMD operation and a single store operation and attempting to generate a destination address for the single store operation, and in response to the memory fault to re-execute the instruction in a second execution mode,
wherein:
the instruction references a memory block that is to serve as a destination for result data generated by execution of the SIMD operation for each lane of a plurality of lanes and further references a mask vector indicating whether each lane of the plurality of lanes is enabled or disabled for the SIMD operation;

in the first execution mode the single store operation is attempted, while ignoring the mask vector, to store result data generated from execution of the SIMD operation to the memory block via the load/store unit; and in the second execution mode a store operation is performed by the load/store unit, based on the mask vector, to store the result data to the memory block for each enabled lane of the plurality of lanes subsequent to executing the SIMD operation to generate the result data for each enabled lane.

17. The processor of claim 16, wherein:

responsive to an absence of a memory fault during execution of the instruction in the first execution mode:

an execution unit of the execution pipeline is configured to perform the SIMD operation for each enabled lane of the plurality of lanes in parallel to generate the result data for each enabled lane; and the load/store unit is configured to complete the single store operation to store the generated result data to the memory block.

18. The processor of claim 16, wherein the execution pipeline is configured to re-execute the instruction at the processor in the second execution mode by:

implementing a resynchronization for the instruction;

decoding the instruction into the SIMD operation and a microcode postamble, wherein:

the microcode postamble includes a store operation for each enabled lane of the plurality of lanes, the store operation configured to store the result data for a corresponding lane in a temporary storage location to a corresponding position in the memory block; and the SIMD operation is configured to reference the temporary storage location in place of a memory location originally identified in the instruction as a destination address of the memory block;

perform the SIMD operation to generate corresponding result data for each enabled lane and store the result data in a corresponding position in the temporary storage location; and direct the load/store unit to perform each store operation to store the result data for each enabled lane from the temporary storage location in a corresponding position of the memory block.

19. The processor of claim 18, wherein the temporary storage location is in a scratchpad memory of the processor.

20. The processor of claim 18, wherein the SIMD operation is an arithmetic operation.

* * * * *